(12) United States Patent
Kim

(10) Patent No.: US 11,332,035 B2
(45) Date of Patent: May 17, 2022

(54) VEHICLE, CONTROLLING METHOD THEREOF AND POWER MANAGEMENT APPARATUS

(71) Applicants: Hyundai Motor Company, Seoul (KR); Kia Motors Corporation, Seoul (KR)

(72) Inventor: Taehoon Kim, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 746 days.

(21) Appl. No.: 16/192,958

(22) Filed: Nov. 16, 2018

(65) Prior Publication Data

US 2020/0047625 A1 Feb. 13, 2020

(30) Foreign Application Priority Data

Aug. 7, 2018 (KR) .................. 10-2018-0091823

(51) Int. Cl.
| | |
|---|---|
| *B60L 58/12* | (2019.01) |
| *G06F 1/28* | (2006.01) |
| *G07C 5/08* | (2006.01) |
| *H02J 7/14* | (2006.01) |
| *B60L 7/10* | (2006.01) |

(52) U.S. Cl.
CPC ............. *B60L 58/12* (2019.02); *G06F 1/28* (2013.01); *G07C 5/0808* (2013.01); *H02J 7/14* (2013.01); *B60L 7/10* (2013.01); *B60Y 2200/91* (2013.01)

(58) Field of Classification Search
CPC ... B60L 58/12; B60L 7/10; G06F 1/28; G07C 5/0808; H02J 7/14; B60Y 2200/91
USPC .......................................................... 307/9.1
See application file for complete search history.

(56) References Cited

U.S. PATENT DOCUMENTS

| | | | | |
|---|---|---|---|---|
| 9,128,159 | B2 * | 9/2015 | Mousseau | G06F 15/00 |
| 2013/0099793 | A1 * | 4/2013 | Shimizu | H02J 7/0025 |
| | | | | 324/426 |
| 2013/0132011 | A1 * | 5/2013 | Mano | G01R 31/392 |
| | | | | 702/63 |
| 2014/0372053 | A1 * | 12/2014 | Lin | G01R 31/3648 |
| | | | | 702/63 |
| 2015/0120225 | A1 | 4/2015 | Kim | |
| 2017/0291501 | A1 * | 10/2017 | Takahashi | B60K 6/485 |

(Continued)

FOREIGN PATENT DOCUMENTS

| | | |
|---|---|---|
| JP | 2003-327061 A | 11/2003 |
| JP | 2005-125916 A | 5/2005 |
| JP | 2009-096417 A | 5/2009 |

(Continued)

*Primary Examiner* — Alfonso Perez Borroto
(74) *Attorney, Agent, or Firm* — Morgan, Lewis & Bockius LLP

(57) ABSTRACT

A vehicle may include a generator configured to generate power; a battery configured to store power generated by the generator; a battery sensor configured to detect a voltage, current and state of charge (SOC) value of the battery; and a power management apparatus configured to receive the voltage, the current and the SOC value of the battery from the battery sensor, configured to identify whether the battery is low-charged based on the SOC value of the battery, and configured to identify a cause of the low charge of the battery based on the voltage and the current of the battery.

6 Claims, 10 Drawing Sheets

(56) References Cited

U.S. PATENT DOCUMENTS

2018/0108925 A1* 4/2018 Won .................... H01M 8/2457
2019/0168616 A1* 6/2019 Morisaki ................. B60L 53/22

FOREIGN PATENT DOCUMENTS

| JP | 2010-267434 A | 11/2010 |
| KR | 10-1406191 B1 | 6/2014 |
| KR | 10-1806705 B1 | 12/2017 |

* cited by examiner (a)

(b)

(c)

VEHICLE, CONTROLLING METHOD THEREOF AND POWER MANAGEMENT APPARATUS

CROSS-THRESHOLD TO RELATED APPLICATION(S)

The present application claims priority to Korean Patent Application No. 10-2018-0091823, filed on Aug. 7, 2018, the entire contents of which is incorporated herein for all purposes by this reference.

BACKGROUND OF THE INVENTION

Field of the Invention

The present invention relates to a vehicle and a controlling method thereof, more, to a vehicle capable of identifying a cause of a low charge battery in the vehicle, a controlling method thereof, and a power management apparatus.

Description of Related Art

In general, a vehicle represents means of transportation that travels on a road or a train track using fossil fuel, electricity, or the like as a power source.

The vehicle may include a starter motor configured for starting, and the vehicle is provided with various automotive electronics to protect the driver and to provide the driver with convenience and fun. Also, the vehicle may include a generator for producing electric power supplied to a starter motor and automotive electronics, and a battery for storing the power produced by the generator.

It is important to maintain the charge state of the battery in the vehicle constant to ensure stable operation of the automotive electronics. If the state of charge of the battery is not maintained constant, the vehicle may not start, or the automotive electronics may fail.

Particularly, as autonomous vehicles and car sharing become popular, it is difficult for the driver to check the battery condition including whether the vehicle starts well or whether the automotive electronics operate without failure.

The information disclosed in this Background of the Invention section is only for enhancement of understanding of the general background of the invention and may not be taken as an acknowledgement or any form of suggestion that the present information forms the prior art already known to a person skilled in the art.

BRIEF SUMMARY

Various aspects of the present invention are directed to providing a vehicle configured for identifying a cause of a low-charged battery in the vehicle, a controlling method thereof, and a power management apparatus.

Additional various aspects of the present invention will be set forth in part in the description which follows and, in part, will be obvious from the description, or may be learned by practice of the present invention.

In accordance with an aspect of the disclosure, a vehicle may include a generator configured to generate power; a battery configured to store power generated by the generator; a battery sensor configured to detect a voltage, current and state of charge (SOC) value of the battery; and a power management apparatus configured to receive the voltage, the current and the SOC value of the battery from the battery sensor, configured to identify whether the battery is low-charged based on the SOC value of the battery, and configured to identify a cause of the low charge of the battery based on the voltage and the current of the battery.

The power management apparatus may identify whether the battery is low-charged during parking of the vehicle, based on a difference between an SOC value of the battery at starting of parking and an SOC value of the battery at starting of driving, and identifies whether the battery is low-charged while driving of the vehicle, based on a difference between an SOC value of the battery at starting of driving and an SOC value of the battery at starting of parking.

The power management apparatus may identify whether the low charge of the battery is caused by a dark current of the vehicle, based on whether an average dark current during parking of the vehicle is greater than a reference dark current.

The power management apparatus may identify that the cause of the low charge of the battery is an excessive parking time, based on whether a parking time of the vehicle is greater than a reference parking time.

The power management apparatus may identify that the cause of the low charge of the battery is a failure of the generator, based on an average voltage of the battery in a regenerative braking of the vehicle.

The power management apparatus may identify that the cause of the low charge of the battery is deterioration of the battery, based on an average current of the battery in a regenerative braking of the vehicle The power management apparatus may identify that the cause of the low charge of the battery is a failure of electrical loads contained in the vehicle or a lack of driving time, based on an average current of the battery in other driving except a regenerative braking of the vehicle.

In accordance with another aspect of the disclosure, a controlling method of a vehicle including a generator configured to generate power and a battery configured to store power generated by the generator, the controlling method may include detecting a voltage, current and state of charge (SOC) value of the battery; identifying whether the battery is low-charged based on the SOC value of the battery; and identifying a cause of the low charge of the battery based on the voltage and the current of the battery.

In accordance with another aspect of the disclosure, a power management apparatus may include a communicator configured to communicate with a battery sensor configured to detect a voltage, current and state of charge (SOC) value of the battery; a storage configured to store the voltage, the current and the state of the SOC value of the battery; and a controller configured to receive the voltage, the current and the SOC value of the battery from the battery sensor through the communicator, configured to identify whether the battery is low-charged based on the SOC value of the battery, and configured to identify a cause of the low charge of the battery based on the voltage and the current of the battery.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
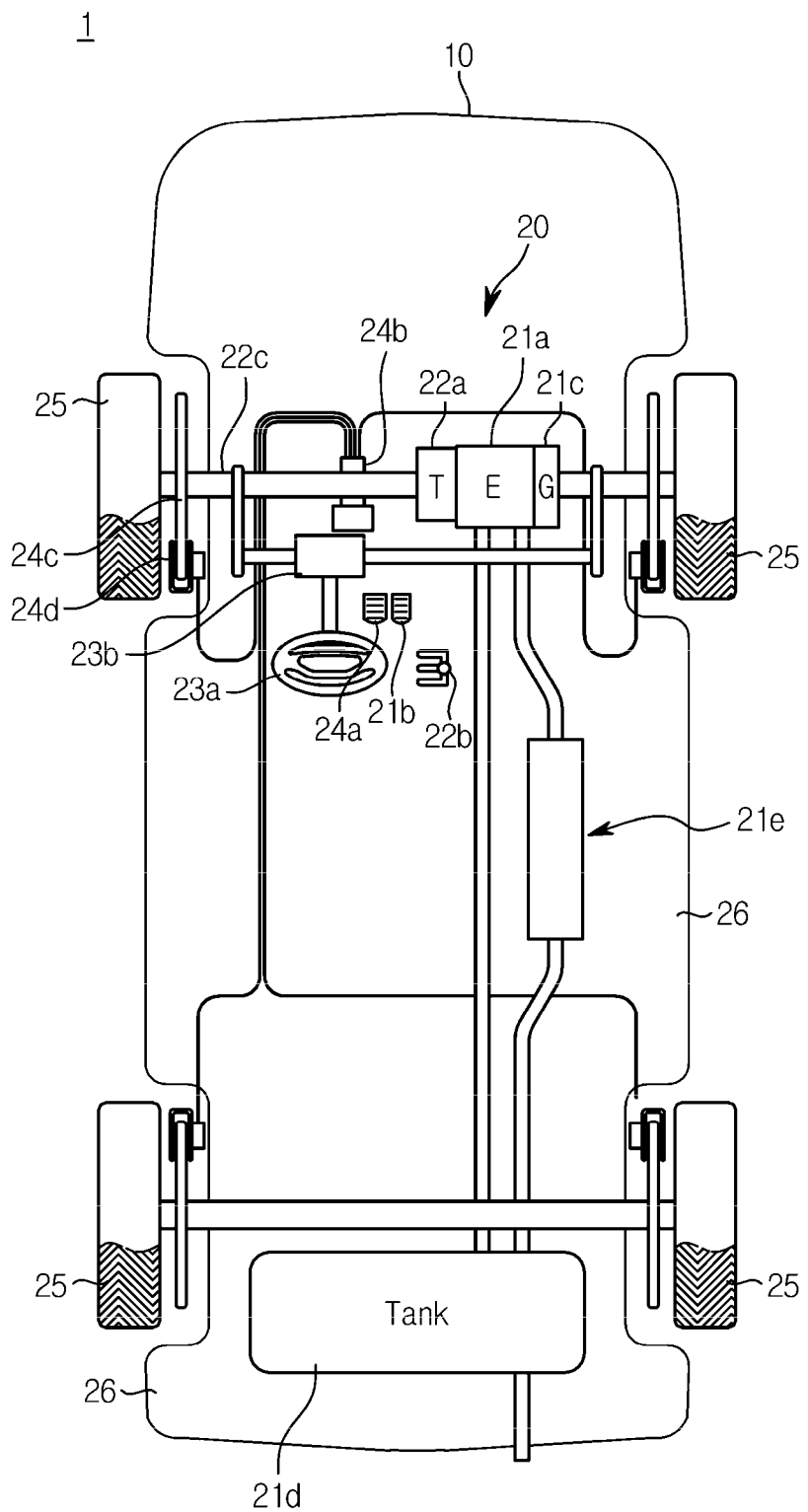
FIG. 1 is a view exemplarily illustrating a main configuration of a vehicle according to an exemplary embodiment of the present invention.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments of the present invention, it will be understood that the present description is not intended to limit the invention(s) to those exemplary embodiments. On the other hand, the invention(s) is/are intended to cover not only the exemplary embodiments of the present invention, but also various alternatives, modifications, equivalents and other embodiments, which may be included within the spirit and scope of the invention as defined by the appended claims.

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The progression of processing operations described is an example; however, the sequence of and/or operations is not limited to that set forth herein and may be changed as is known in the art, with the exception of operations necessarily occurring in an order. Furthermore, respective descriptions of well-known functions and constructions may be omitted for increased clarity and conciseness.

Additionally, various exemplary embodiments will now be described more fully hereinafter with reference to the accompanying drawings. The exemplary embodiments may, however, be embodied in various forms and may not be construed as being limited to the exemplary embodiments set forth herein. These embodiments are provided so that the present disclosure will be thorough and complete and will fully convey the exemplary embodiments to those of ordinary skill in the art. Like numerals denote like elements throughout.

It will be understood that, although the terms first, second, etc. may be used herein to describe various elements, these elements may not be limited by these terms. These terms are only used to distinguish one element from another. As used herein, the term "and/or," includes any and all combinations of one or more of the associated listed items.

It will be understood that when an element is referred to as being "connected," or "coupled," to another element, it may be directly connected or coupled to the other element or intervening elements may be present. In contrast, when an element is referred to as being "directly connected," or "directly coupled," to another element, there are no intervening elements present.

The terminology used herein is for describing various exemplary embodiments only and is not intended to be limiting. As used herein, the singular forms "a," "an," and "the," are intended to include the plural forms as well, unless the context clearly indicates otherwise.

Reference will now be made in detail to the exemplary embodiments of the present invention, examples of which are illustrated in the accompanying drawings, wherein like reference numerals refer to like elements throughout.

The expression, "at least one of a, b, and c," may be understood as including only a, only b, only c, both a and b, both a and c, both b and c, or all of a, b, and c.

Reference will now be made in detail to embodiments of the present invention, examples of which are illustrated in the accompanying drawings.

Figure 2:
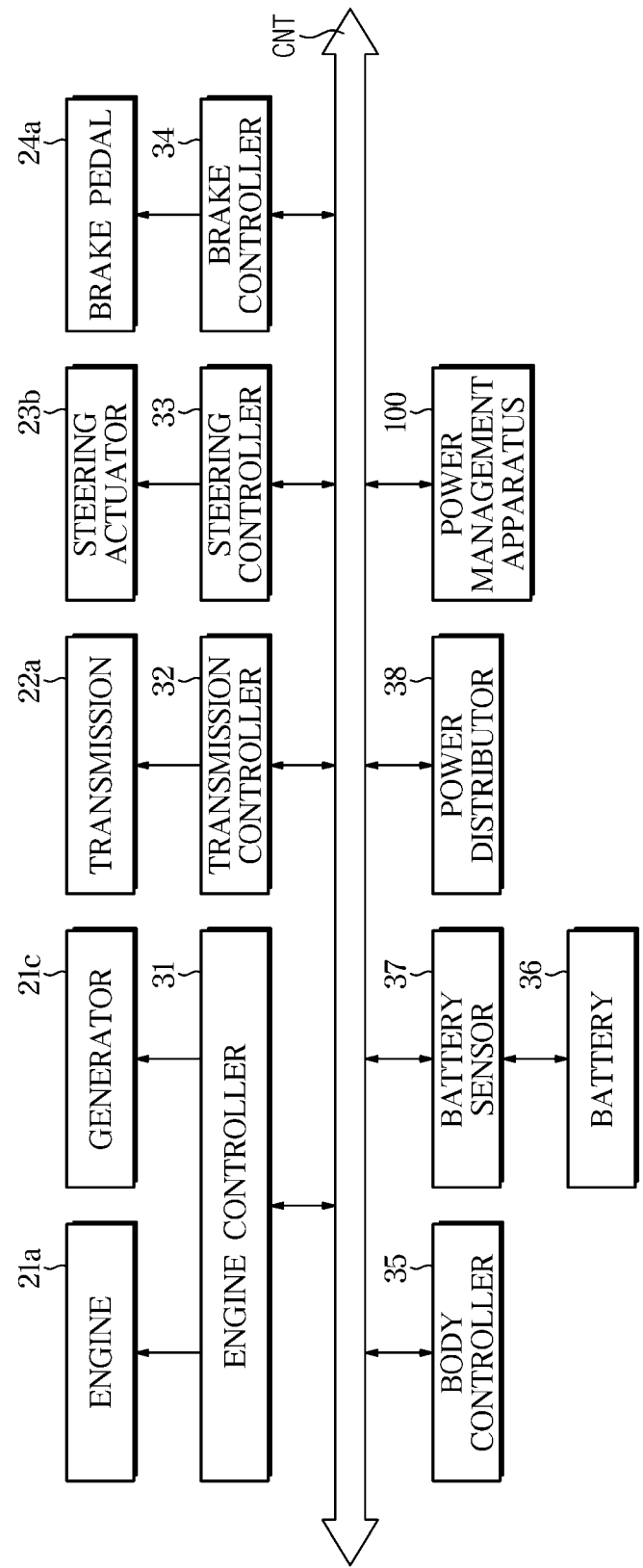
FIG. 2 is a view exemplarily illustrating automotive electronics of the vehicle according to an exemplary embodiment of the present invention.
Figure 3:
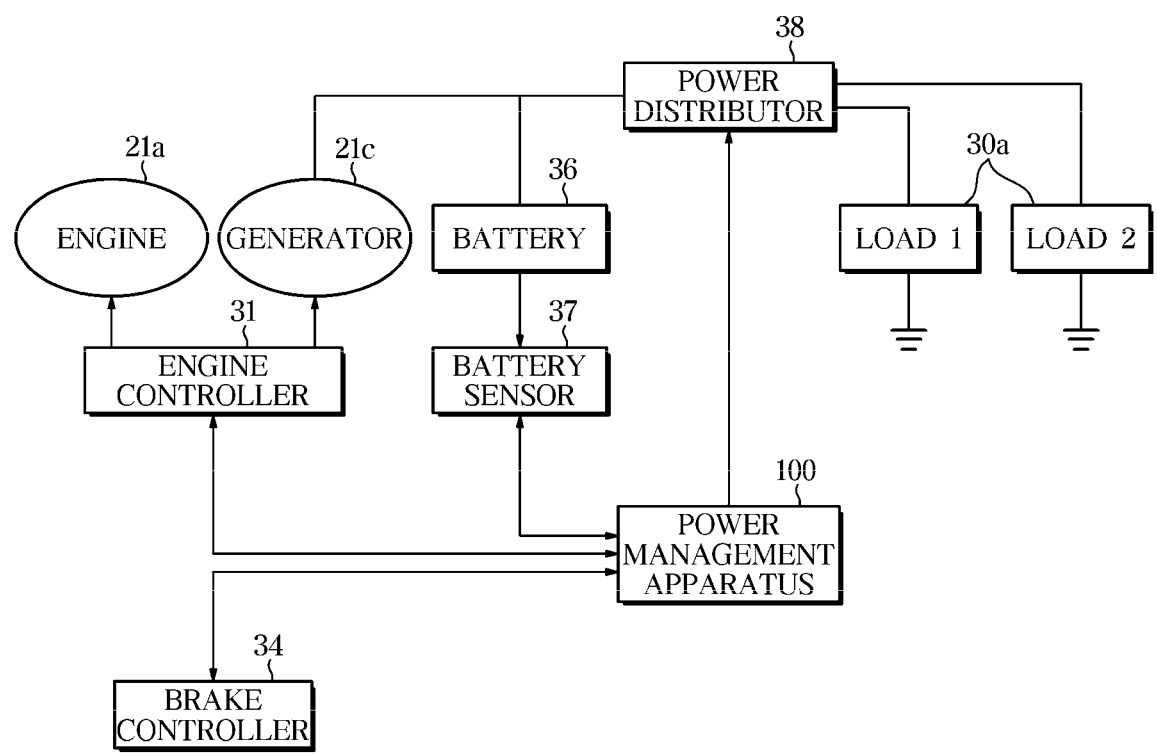
FIG. 3 is a view exemplarily illustrating a power system of the vehicle according to an exemplary embodiment of the present invention.

FIG. 1 is a view exemplarily illustrating a main configuration of a vehicle according to an exemplary embodiment of the present invention. FIG. 2 is a view exemplarily illustrating automotive electronics of the vehicle according to an exemplary embodiment of the present invention. FIG. 3 is a view exemplarily illustrating a power system of the vehicle according to an exemplary embodiment of the present invention.

Referring FIGS. 1, 2 and 3, a vehicle 1 may include a body 10 forming an external of the vehicle 1 and receiving a driver and/or cargo, a chassis 20 having components other than the body, and automotive electronics 30 protecting a driver and providing the convenience to the driver.

The body 10 may form an internal space in which the driver can stay, an engine compartment accommodating an engine, and a trunk compartment accommodating the cargo. For example, the vehicle body 10 may include a hood, a roof panel, a door, and a trunk lid. Furthermore, to ensure the field of vision of the driver, the body 10 may include a front window disposed in front of the body 10, a side window disposed on the side of the body 10 and a rear window disposed on the rear side of the body 10.

The chassis 20 may include an apparatus configured to generate a power to drive the vehicle 1 according to the control of the driver, and an apparatus configured to drive/brake/steer the vehicle by use of the power.

For example, the chassis 20 may include a power generation device 21, the power transmission device 22, a steering system 23, a brake system 24 and a wheel 25 as shown in FIG. 1.

The power generation device 21 may generate power i.e. torque and electricity for driving the vehicle 1, and may include an engine 21a, an acceleration pedal 21b, a battery 21c, a fuel supply device 21d and an exhaust device 21e.

The power transmission device 22 may transmit the power generated in the power generation device 21 to the wheel 25 and may include a transmission 22a, a shift lever 22b, and a driveshaft 22c.

The steering system 23 may regulate a driving direction and may include a steering wheel 23a, a steering actuator 23b, and a steering link 23c.

The brake system 24 may stop the rotation of the wheel 25 and may include a brake pedal 24a, a brake actuator 24b, a drake disc 24c, and a brake pad 24d.

The wheel 25 may move the vehicle 1 by receiving the torque from the power generation device 21 through the power transmission device 22. The wheel 25 may include a front wheel provided at the front of the vehicle and a rear wheel provided at the rear of the vehicle.

As well as the above mentioned mechanical components, the vehicle 1 may further include automotive electronics 30 for the safety and convenience of the driver and passenger For example, as illustrated in FIG. 2 and FIG. 3, the vehicle 1 may include an engine controller 31, a transmission controller 32, a steering controller 33, a brake controller 34, a body controller 35, a battery 36, a battery sensor 37, and a power management apparatus 100.

The engine controller 31 may control an operation of the engine 21a and manage the engine 21a in a response to an acceleration command of the driver via the accelerator pedal 21b. The engine controller 31 may perform an engine torque control, fuel consumption control and/or engine failure diagnosis. For example, the engine controller 31 may be referred to as an engine management system (EMS)

Furthermore, the engine controller 31 may control the operation of the generator 21c.

The generator 21c may receive the torque from the engine 21a and generate the electricity from the torque. As illustrated in FIG. 3, the generator 21c may supply the electricity to the battery 36 and a plurality of loads 30a contained in the vehicle 1.

The generator 21c may include a rotator configured to rotate by being connected to the engine 21a depending on the rotation, and a stator configured to be fixed without rotation. The generator 21c may include a field magnet configured to generate a magnet field and an armature configured to generate power by relatively moving against the electric field of the field magnet.

The field magnet may include a field coil, and the magnitude of the magnetic field generated by the field magnet may vary depending on the magnitude of the current flowing into the field coil. Furthermore, the magnitude of the voltage and/or current generated by the armature may vary depending on the magnitude of the magnetic field generated by the field magnet.

The engine controller 31 may control the generator 21c based on a driving condition of the vehicle 1 and a state of charge (SOC) value of the battery 36. For example, the engine controller 31 may control the amount of current flowing into the field coil of the generator 21c, and control the generation of the power of the generator 21c by the current control of the field coil. In other words, the engine controller 31 may control the voltage and current output from the generator 21c.

The transmission controller 32 may control an operation of the transmission 22a based on a driving speed of the vehicle 1 or in a response to a transmission command of the driver through the shift lever 22b. The transmission controller 32 may perform engine torque control during clutch control, transmission control and/or shifting. The transmission controller 32 may be referred to various names such as transmission control unit (TCU).

The steering controller 33 may control the steering actuator 23b to assist the driver so that the driver can easily operate a steering wheel. For example, the steering controller 33 may control the steering actuator 23b to reduce a steering force at the time of low-speed driving or at the time of a parking and to increase the steering force at the time of high-speed driving. The steering controller 33 may be referred to as various names such as power steering controller.

The brake controller 34 may control the brake actuator 24a based on the environment of the vehicle 1 or in a response to a brake command of the driver by a brake pedal. The brake controller 34 also may maintain the balance of the vehicle 1. For example, the drake controller 34 may perform automatic parking brake control, anti-slip during braking, and/or slip-proof during steering. The brake controller 34 may be referred to as various names such as electronic braking controller.

The body controller 35 may control the operation of the automotive electronics of the vehicle body 10 providing the convenience to the driver or securing the safety of the driver. For example, the body controller 35 may control a vehicle door lock disposed in the vehicle 1, a head lamp, a wiper, a power seat, a seat heater, a cluster, an interior lamp, a navigation system, and a multi-function switch. The body controller 35 may be referred to as various names such as body control module.

As illustrated in FIG. 3, the battery 36 may store the power generated by the generator 21c and supply the power to the plurality of loads 30a contained in the vehicle 1. For example, the battery 36 may generate the power by the rotation of the engine 21a, receive the power from the generator 21c, and store the power (electrical energy). Furthermore, the battery 36 may supply the power to the starter motor configured for the ignition or to the plurality of loads 30a of the vehicle 1.

The battery sensor 37 may acquire state information related to the battery 36. The battery sensor 37 may include a voltage sensor measuring an output voltage of the battery 36, a current sensor measuring input and output current of the battery 36, and a temperature sensor measuring a temperature of the battery 36. The battery sensor 37 may determine a state of charge (SOC) value of the battery 36 and/or a state of health (SoH) of the battery 36, based on the voltage/current/temperature of the battery 36, and output the voltage of the battery 36, the current of the battery 36, the SOC value of the battery 36, and the SoH of the battery 36.

A power distributor 38 may distribute/supply the power from the generator 21c and/or the battery 36 to the plurality of loads 30a. For example, the power distributor 38 may allow the power supply from the generator 21c and/or the battery 36 to the plurality of loads 30a or block the power supply.

The power management apparatus 100 may detect a low voltage and/or a low-charge of the battery 36 and identify a cause of the low voltage and/or the low-charge of the battery 36. For example, the power management apparatus 100 may identify whether the vehicle 1 drives or not based on the output of the engine controller 31 and identify whether the vehicle 1 brakes or not based on the output of the brake controller 34. The power management apparatus 100 may monitor the voltage, current and/or SOC value of the battery 36 while driving of the vehicle 1. Furthermore, the power management apparatus 100 may identify a cause of the low voltage and/or the low-charge of the battery 36 based on the voltage, current and/or SOC value of the battery 36 while driving of the vehicle 1.

The configuration and operation of the power management apparatus 100 will be described in detail.

The automotive electronics 30 may communicate with each other via the vehicle communications network (CNT). For example, the automotive electronics 30 may send and receive data through Ethernet, Media Oriented Systems Transport (MOST), FlexRay, Controller Area Network (CAN), and Local Interconnect Network (LIN).

Figure 4:
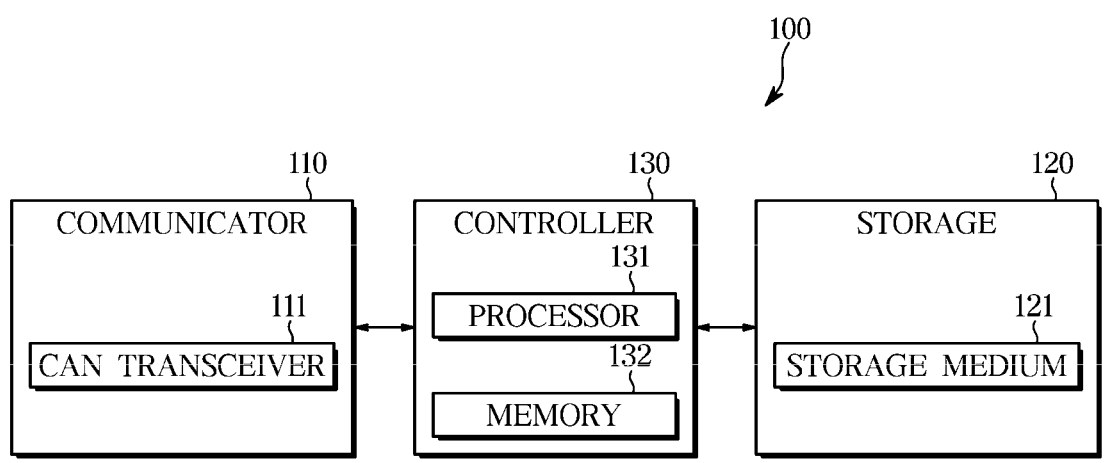
FIG. 4 is a view exemplarily illustrating a power management apparatus of the vehicle according to an exemplary embodiment of the present invention.
Figure 5:
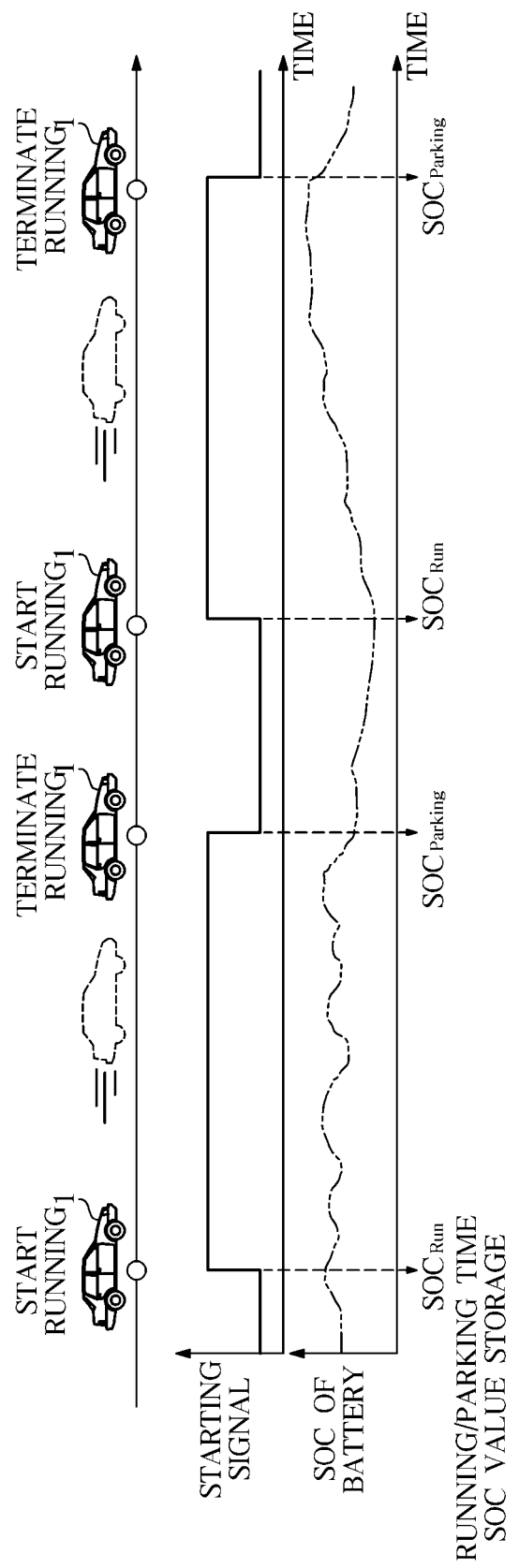
FIG. 5 is a view exemplarily illustrating a time point for identifying whether a battery is low-charged in the vehicle according to an exemplary embodiment of the present invention.

FIG. 4 is a view exemplarily illustrating a power management apparatus of the vehicle according to an exemplary embodiment of the present invention. FIG. 5 is a view exemplarily illustrating a time point for identifying whether a battery is low-charged in the vehicle according to an exemplary embodiment of the present invention.

Referring to FIG. 4, the power management apparatus 100 may include a communicator 110 exchanging data with the automotive electronics 30 through the CNT, a storage storing information related to the voltage, current and/or SOC value of the battery 36 while driving of the vehicle 1, and a controller 130 identifying a cause of the low voltage and/or the low-charge of the battery 36 based on the voltage, current and/or SOC value of the battery 36 while driving of the vehicle 1

The communicator 110 may include a CAN transceiver 111 receiving a communication signal from other automotive electronics 30 and transmitting a communication signal to other automotive electronics 30 through the CNT, and a CAN controller configured for controlling an operation of the CAN transceiver 111.

The CAN transceiver 111 may receive a communication signal from the automotive electronics 30 and output the communication signal to the controller 130, via the CNT. The CAN transceiver 111 may receive a communication signal from the power management controller 130, and transmit the communication signal to automotive electronics 30 via the CNT. For example, the CAN transceiver 111 may receive communication data related to the voltage, current and/or SOC value of the battery 36 from the battery sensor 37, and transmit the communication data to the controller 130. The CAN transceiver 111 may transmit a power distribution control signal transmitted from the controller 130 to the power distributor 38.

The storage 120 may include a storage medium 121 storing information related to the voltage, current and/or SOC value of the battery 36, and a storage controller configured for controlling storage/deletion/loading of data stored in the storage medium 121.

The storage medium 121 may store a profile of the voltage of the battery 36, a profile of the current of the battery 36, and a profile of the SOC value of the battery 36. The profile of the voltage of the battery 36 may include a voltage value of the battery 36 over time, an average voltage value of the battery 36 during regenerative braking of the vehicle 1, and an average voltage value of the battery 36 while driving other than the regenerative braking of the vehicle 1. The profile of the current of the battery 36 may include a current value of the battery 36 over time, an average current value of the battery 36 during regenerative braking of the vehicle 1, and an average current value of the battery 36 while driving other than the regenerative braking of the vehicle 1. The profile of the SOC value of the battery 36 may include an SOC value of the battery 36 when the vehicle 1 starts to park (or terminates driving), and an SOC value of the battery 36 when the vehicle 1 starts to drive (or terminates parking).

The storage medium 121 may include a flash memory, a Solid Stat Drive (SSD), and a Hard Disc Drive (HDD).

The controller 130 may include one or two or more microprocessor 131 processing the communication data of the communicator 110 and the stored data of the storage 120, and one or two or more memory 132 temporarily storing the communication data of the communicator 110 and the stored data of the storage 120. The controller 130 may include hardware such as the processor 131 and the memory 132 and software such as programs (a series of instructions) and data stored in the memory 132.

The memory 132 may store control programs and control data for controlling the operation of the power management apparatus 100. For example, the memory 132 may store control programs and control data for allowing the processor 131 to process the voltage, current and/or SOC value of the battery 36 during the vehicle 1 drives.

The memory 132 may temporarily store the communication data of the communicator 110 and the stored data of the storage 120.

For example, the memory 132 may receive the information related to the voltage, current and/or SOC value of the battery 36, from the communicator 110, and memory the information related to the voltage, current and/or SOC value of the battery 36. Furthermore, in a response to a load command of the processor 131, the memory 132 may transmit the information related to the voltage, current and/or SOC value of the battery 36 to the processor.

The memory 132 may temporarily store a power distribution control signal generated by the processor 131. In a response to the communication command of the processor 131, the memory 132 may transmit the power distribution control signal to the communicator 110.

The memory 132 may include a nonvolatile memory for storing data for long-term, such as Read Only Memory (ROM) and flash memory, and a volatile memory for temporarily storing data, such as Static Random Access Memory (S-RAM) and Dynamic Random Access Memory (D-RAM).

The processor 131 may process the data stored in the memory 132 according to the program (set of instructions) stored in the memory 132, and supply the processed data to the memory 132 again.

For example, the processor 131 may load the information related to the voltage, current and SOC value of the battery 36 from the memory 132, identify whether the battery 36 is low-charged based on the SOC value of the battery 36, and identify a cause of the low-charge of the battery 36 based on the voltage and current of the battery 36. The processor 131 may generate a power distribution control signal corresponding to the cause of the low charge of the battery 36, or a control signal for limiting the power consumption of each of the automotive electronics 30. Furthermore, the processor 131 may generate a message for a reliable charging of the battery 36 to the driver based on the cause of the low charge of the battery 36.

The processor 131 may include an operational circuit for performing such a logical operation and an arithmetic operation, and a memory circuit memorizing the operated data.

As mentioned above, the controller 130 may process the information related to the voltage, current and SOC value of the battery 36, from the memory 132, identify whether the battery 36 is low-charged, and identify a cause of the low-charge of the battery 36.

The low charge of the battery 36 may represent that a reduction of the SOC value of the battery 36 is equal to or greater than a threshold value during a certain time period or during a certain operation.

For example, the low charge of the battery 36 may include a low-charge of the battery 36 during parking and a low-charge of the battery 36 while driving. For example, the low charge of the battery 36 may represent that a difference between an SOC value of the battery 36 when the vehicle 1 starts to park, and an SOC value of the battery 36 when the vehicle 1 terminates parking (or starting to drive) is equal to or greater than a threshold value. Furthermore, the low charge of the battery 36 may represent that a difference between an SOC value of the battery 36 when the vehicle 1 starts to drive, and an SOC value of the battery 36 when the vehicle 1 terminates driving (or starting to park) is equal to or greater than a threshold value.

The controller 130 may receive a signal related to starting of the vehicle 1, from the engine controller 31 to identify whether it is the low charge of the battery 36 during parking or the low charge of the battery 36 while driving. The controller 130 may receive information related to the SOC value of the battery 36 from the battery sensor 37 in a response to the signal related to starting of the vehicle 1.

For example, as illustrated in FIG. 5, the controller 130 may identify starting to run (or terminating parking) of the vehicle 1 and staring to park (or terminating running) based on the starting signal of the engine controller 31.

The controller 130 may store an SOC value of the battery 36 (SOC_run) transmitted from the battery sensor 37 at the starting of running of the vehicle 1. Furthermore, the controller 130 may store an SOC value of the battery 36 (SOC_parking) transmitted from the battery sensor 37 at the terminating of running of the vehicle 1 (or starting to park). The controller 130 may determine a change amount (increase/decrease amount) of the battery 36 during running based on a difference (SOC_parking−SOC_run) between the SOC value of the battery 36 (SOC_parking) at the terminating of running and the SOC value of the battery 36 (SOC_run) at the starting of running. Furthermore, the controller 130 may identify the low charge of the battery 36 when an absolute value of a reduction rate of the SOC value of the battery 36 during running is greater than a threshold reduction rate during running. The threshold reduction rate during running may vary according to the generation control of the vehicle 1 and the type of the battery 36.

The low charge of the battery 36 during running may be caused by a failure of the generator 21c, the deterioration of the battery 36, driver's driving pattern or a failure of the automotive electronics 30. The controller 130 may identify the cause of the low-charge of the battery 36 during running, based on the voltage and current of the battery 36 received from the battery sensor 37.

The controller 130 may store an SOC value of the battery 36 (SOC_parking) transmitted from the battery sensor 37 at the starting of parking of the vehicle 1 (terminating running). Furthermore, the controller 130 may store an SOC value of the battery 36 (SOC_run) transmitted from the battery sensor 37 at the terminating of parking of the vehicle 1 (or starting to drive). The controller 130 may determine a change amount (increase/decrease amount) of the battery 36 during parking based on a difference (SOC_run−SOC_parking) between the SOC value of the battery 36 (SOC_run) at the terminating of parking and the SOC value of the battery 36 (SOC_parking) at starting of parking. Furthermore, the controller 130 may identify the low charge of the battery 36 during parking when an absolute value of a reduction rate of the SOC value of the battery 36 during parking is greater than a threshold reduction rate during parking. The threshold reduction rate during parking may vary according to the type of the battery 36.

The low charge of the battery 36 during parking may be caused by an excessive parking time or an abnormal dark current. The controller 130 may identify the cause of the low-charge of the battery 36 during parking, based on the voltage and current of the battery 36 received from the battery sensor 37. The dark current may represent a current which is consumed by the automotive electronics 30 of the vehicle 1 during parking.

As described above, the power management apparatus 100 may identify whether the battery 36 is low-charged during running and/or whether the battery 36 is low-charged during parking, based on the starting signal received from the engine controller 31 and the SOC value of the battery 36 received from the battery sensor 37.

Figure 6:
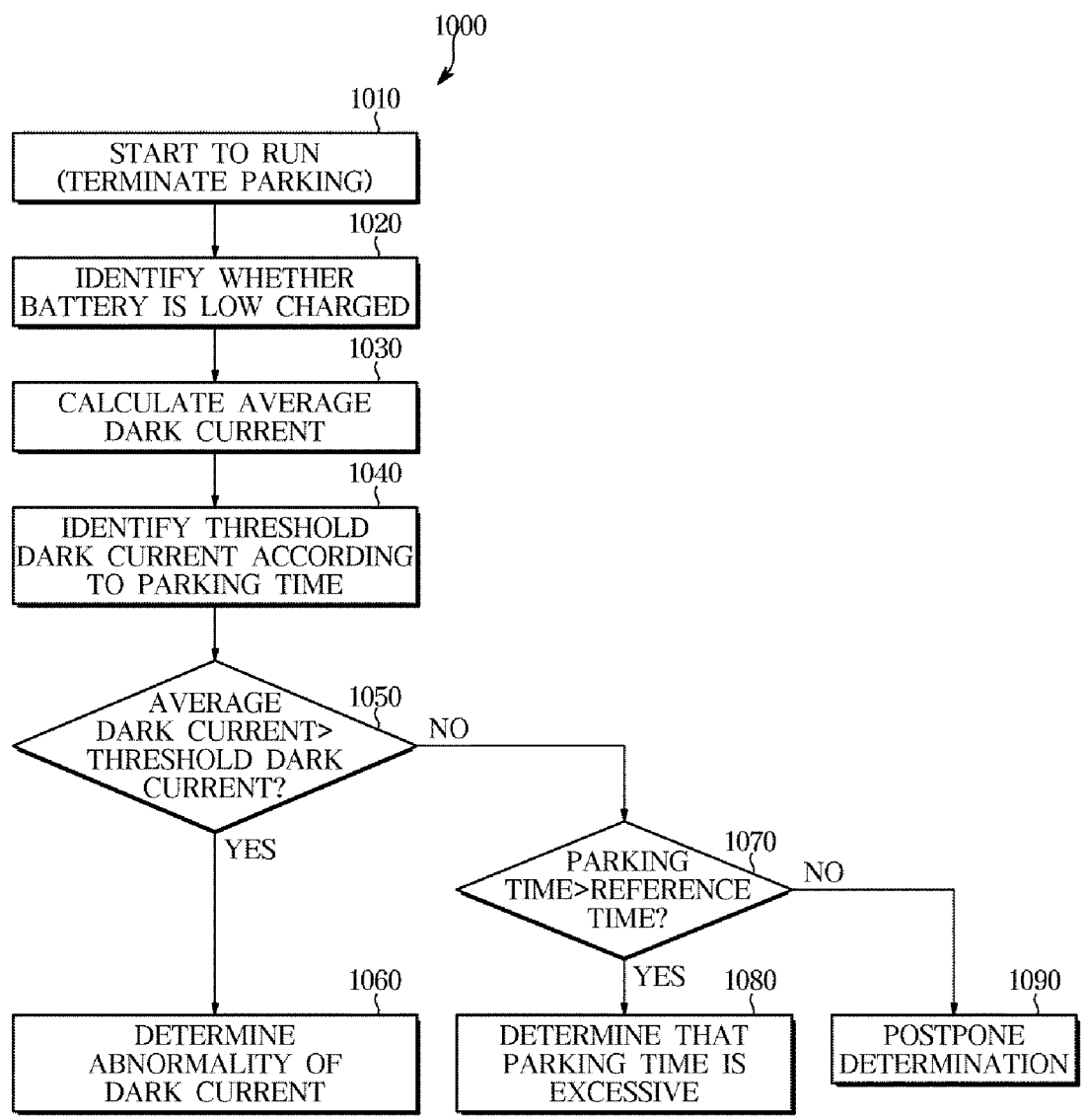
FIG. 6 is a view exemplarily illustrating a method for identifying a low-charged battery during parking in the vehicle according to an exemplary embodiment of the present invention.

FIG. 6 is a view exemplarily illustrating a method for identifying a low-charged battery during parking in the vehicle according to an exemplary embodiment of the present invention.

A method for identifying the low charge of the battery during parking of the vehicle 1 (1000) will be describe with reference to FIG. 6.

The power management apparatus 100 identifies that the vehicle 1 starts to run (terminating parking) (1010).

The power management apparatus 100 may receive a starting signal from the engine controller 31 via the CNT. The power management apparatus 100 may receive the starting signal via the communicator 110. Furthermore, the power management apparatus 100 may identify whether the vehicle starts to run (or terminating parking), based on the starting signal.

After starting to run, the power management apparatus 100 identifies whether the battery 36 is low-charged (1020).

The power management apparatus 100 may receive information related to the SOC value of the battery 36 from the battery sensor 37, and store the received information related to the SOC value of the battery 36. For example, the power management apparatus 100 may receive the SOC value of the battery 36 at the starting of parking of the vehicle 1 (terminating running) and the SOC value of the battery 36 at the terminating of parking of the vehicle 1 (staring to run).

The controller 130 of the power management apparatus 100 may determine a change amount of the battery 36 during parking based on a difference (SOC_run−SOC_parking) between the SOC value of the battery 36 (SOC_run) at the terminating of parking and the SOC value of the battery 36 (SOC_parking) at starting of parking. Furthermore, the power management apparatus 100 may identify the low charge of the battery 36 when an absolute value of a reduction rate of the SOC value of the battery 36 (SOC_run−SOC_parking) during parking is greater than a threshold reduction rate during parking (SOC_threshold). The threshold reduction rate during parking (SOC_threshold) may vary according to the type of the battery 36.

The power management apparatus 100 may determine an average dark current (I_avg) (1030).

The power management apparatus 100 may determine an average dark current of the battery 36 (I_avg) during parking, based on the reduction rate of the SOC value of the battery 36 (SOC_run–SOC_parking) during parking and a parking time (T_parking).

For example, the controller 130 of the power management apparatus 100 may determine the average dark current of the battery 36 (I_avg) during parking based on a value acquired by dividing the reduction rate of the SOC value of the battery 36 (SOC_run–SOC_parking) during parking, with the parking time (T_parking).

The power management apparatus 100 may check a threshold dark current (I_threshold) corresponding to the parking time (T_parking) (1040).

As the parking takes more times, the vehicle 1 may limit functions during parking, to reduce the dark current. In other words, as the SOC value of the battery 36 is reduced, the vehicle 1 may sequentially block the power supplied to the automotive electronics that are operated during parking. As a result, the average dark current may be reduced as the parking time (T_parking) is longer.

Therefore, to identify whether an abnormality occurs in the dark current, the threshold dark current (I_threshold) may be changed to correspond to the parking time (T_parking). The power management apparatus 100 may store a threshold dark current look-up table in the storage 120, wherein the threshold dark current look-up table includes a plurality of parking times (T_parking), and a plurality of threshold dark current (I_threshold) corresponding to the plurality of parking times (T_parking).

The power management apparatus 100 identifies whether the average dark current (I_avg) is greater than the threshold dark current (I_threshold) (1050).

The controller 130 of the power management apparatus 100 may compare the average dark current (I_avg) with the threshold dark current (I_threshold) which is selected according to the parking time (T_parking), and identify whether the average dark current (I_avg) is greater than the threshold dark current (I threshold) which is selected according to the parking time (T_parking).

When the average dark current (I_avg) is greater than the threshold dark current (I_threshold) (yes in 1050), the power management apparatus 100 may identify that the automotive electronics 30 have the abnormality in the dark current (1060).

When the average dark current (I_avg) is greater than the threshold dark current (I_threshold), the controller 130 of the power management apparatus 100 may identify that the low charge of 30 occurs due to the abnormality of the dark current of the automotive electronics 30.

When the average dark current (I_avg) is not greater than the threshold dark current (I_threshold) (no in 1050), the power management apparatus 100 may identify whether the parking time (T_parking) is greater than a threshold parking time (T_threshold) (1070).

The controller 130 of the power management apparatus 100 may compare the parking time (T_parking) with the threshold parking time (T_threshold), and identify whether the parking time (T_parking) is greater than the threshold parking time (T_threshold). The threshold parking time (T_threshold) may be set as an excessive parking time which may cause the low charge of the battery 36.

When the parking time (T_parking) is greater than the threshold parking time (T_threshold) (yes in 1070), the power management apparatus 100 identifies that the parking time is excessive (1080).

When the parking time (T_parking) is greater than the threshold parking time (T_threshold), the controller 130 of the power management apparatus 100 may identify that the low charge of 30 occurs due to the excessive parking time.

When the average dark current (I_avg) is not greater than the threshold dark current (I_threshold) and the parking time (T_parking) is not greater than the threshold parking time (T_threshold) (no in 1070), the power management apparatus 100 may postpone identifying the cause of the low charge of the battery 36 (1090).

As described above, the power management apparatus 100 may identify the cause of the low charge of the battery 36, based on the average dark current (I_avg) and the parking time (T_parking).

Hereinafter, a case in which the power management apparatus 100 identifies the cause of the low charge of the battery 36 during the vehicle 1 drives will be described.

To identify the cause of the low charge of the battery 36, the power management apparatus 100 may divide the driving of the vehicle 1 into a regenerative braking section for charging and a driving section except the regenerative braking section (hereinafter referred to as "non-regenerative braking section"), and the power management apparatus 100 may identify the charge and discharge of the automotive electronics 30 in the regenerative braking section and identify the charge and discharge of the automotive electronics 30 in the non-regenerative braking section.

Figure 7:
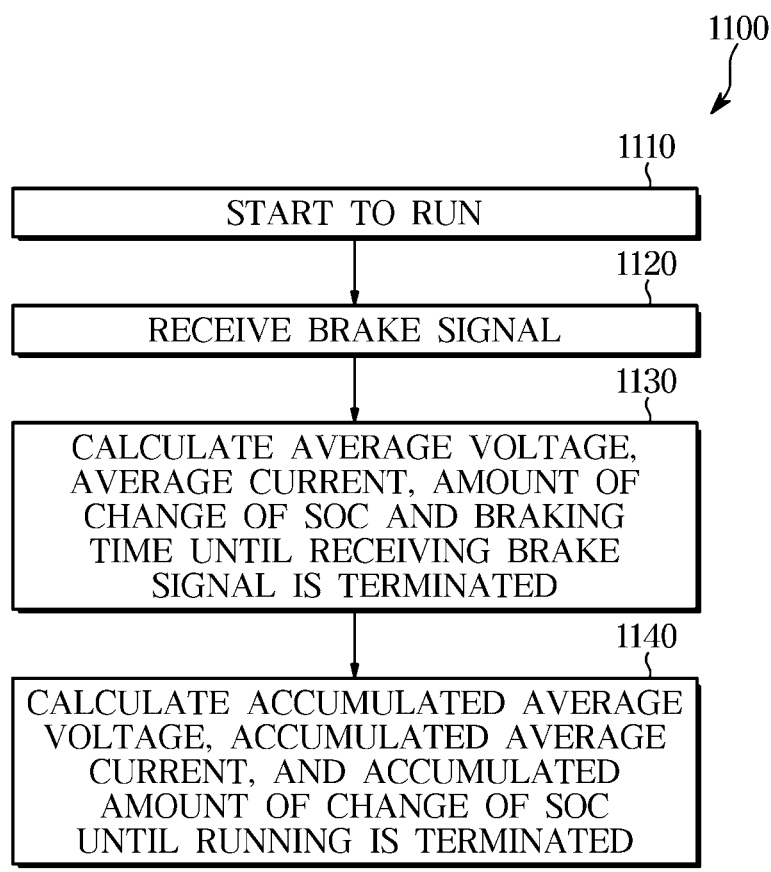
FIG. 7 is a view exemplarily illustrating a data collection method in a regenerative braking section of the vehicle according to an exemplary embodiment of the present invention.
Figure 8:
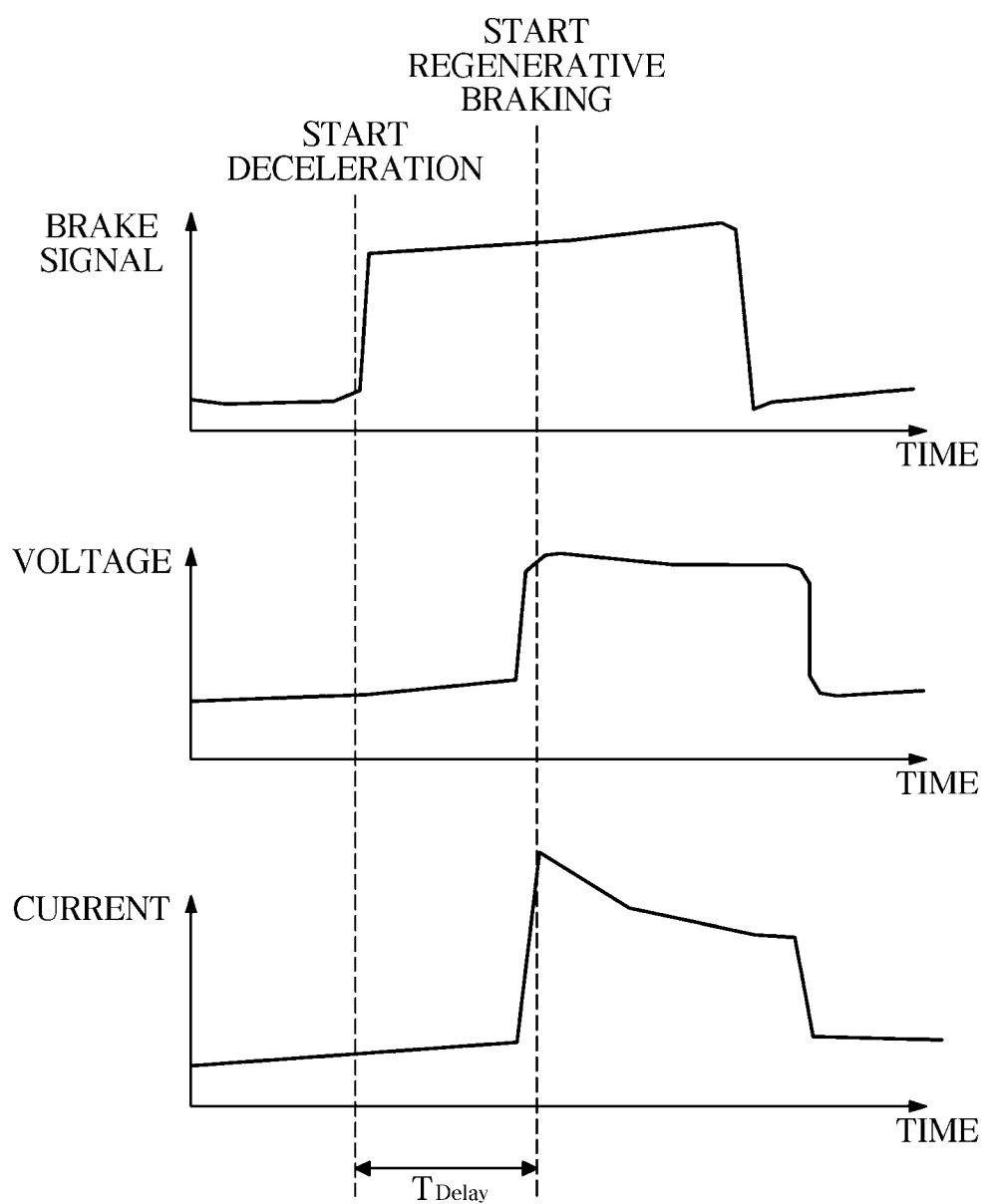
FIG. 8 is a view exemplarily illustrating a braking signal, a regenerative braking voltage and regenerative braking current during a regenerative braking of the vehicle according to an exemplary embodiment of the present invention.

FIG. 7 is a view exemplarily illustrating a data collection method in a regenerative braking section of the vehicle according to an exemplary embodiment of the present invention. FIG. 8 is a view exemplarily illustrating a braking signal, a regenerative braking voltage and regenerative braking current during a regenerative braking of the vehicle according to an exemplary embodiment of the present invention.

A data collection method (1100) in the regenerative braking section of the vehicle 1 will be described with reference to FIGS. 7 and 8.

The power management apparatus 100 identifies that the vehicle 1 starts to run (1110).

The power management apparatus 100 may receive a starting signal from the engine controller 31 via the CNT. The controller 130 may receive the starting signal via the communicator 110. Furthermore, the power management apparatus 100 may identify whether the vehicle starts to run (or terminating parking), based on the starting signal.

The power management apparatus 100 receives a brake signal (1120).

The driver may press the brake pedal 24a for braking the vehicle 1, and the brake controller 34 may control the brake actuator 24b based on the position of the brake pedal 24a. Furthermore, the brake controller 34 may transmit the brake signal to the power management apparatus 100 via the CNT.

The power management apparatus 100 may receive the brake signal from brake controller 34 via the CNT.

The power management apparatus 100 may determine an average voltage of the battery 36 (V_regen_cur), an average current of the battery 36 (I_regen_cur), and a change amount of SOC value of the battery 36 (ΔSOC_regen_cur) and a regenerative braking time (T_regne_cur) until receiving the brake signal is terminated (1130).

The power management apparatus 100 may receive a voltage of the battery 36, a current of the battery 36 and an SOC value of the battery 36 from the battery sensor 37 during the regenerative braking.

As for the regenerative braking time, a time when a brake signal is transmitted by the brake controller 34 may be different from a time when the regenerative braking is performed. For example, to provide a stable sense of brake pedal to the driver, the brake controller 34 may perform the regenerative braking when a predetermined delay time (T_delay) elapses from when the driver presses the brake pedal 24, as illustrated in FIG. 8.

The controller 130 of the power management apparatus 100 may identify that the regenerative braking is started when the predetermined delay time (T_delay) elapses after the brake signal is received from the brake controller 34.

The controller 130 may determine an average voltage of the battery 36 (V_regen_cur) during the current regenerative braking, an average current of the battery 36 (I_regen_cur) during the current regenerative braking, and a change amount of SOC value of the battery 36 (ΔSOC_regen_cur) during the current regenerative braking, based on the voltage of the battery 36, the current of the battery 36, the SOC value of the battery 36 and the regenerative braking time (T_regen_cur).

The controller 130 may determine the average voltage of the battery 36 (V_regen_cur) based on the average value of the voltage of the battery 36 which is received from the battery sensor 37 during the regenerative braking (T_regen_cur), and determine the average current of the battery 36 (I_regen_cur) based on the average value of the current of the battery 36 which is received from the battery sensor 37 during the regenerative braking (T_regen_cur). Furthermore, the controller 130 may determine the change amount of the SOC value of the battery 36 (ΔSOC_regen_cur) based on a difference between an SOC value of the battery 36 when the regenerative braking is started, and an SOC value of the battery 36 when the regenerative braking is terminated.

The power management apparatus 100 may determine an accumulated average voltage of the battery 36 (V_regen_acc), an accumulated average current of the battery 36 (I_regen_acc), an accumulated change amount of the SOC value of the battery 36 (ΔSOC_regen_acc) and an accumulated regenerative braking time (T_regne_acc) until the vehicle 1 terminates running (1130).

The controller 130 of the power management apparatus 100 may determine the accumulated average voltage (V_regen_acc) based on a previous accumulated average voltage (V_regen_pre), a previous accumulated regenerative braking time (T_reg_pre), the current average voltage (V_regen_cur), and the current regenerative braking time (T_regen_cur).

For example, the controller 130 may determine the accumulated average voltage of the battery 36 (V_regen_acc) by use of an equation 1.

$$V_{regen\_acc} = \frac{T_{regen\_pre} * V_{regen\_pre} + T_{regen\_cur} * V_{regen\_cur}}{T_{regen\_pre} + T_{regen\_cur}}.$$ [Equation 1]

V_regen_acc represents an accumulated average voltage of the battery 36 until the vehicle 1 terminates running, V_regen_pre represents a previous accumulated average voltage of the battery 36, T_regen_pre represents a previous accumulated regenerative braking time, V_regen_cur represents a current average voltage of the battery 36, and T_regen_cur represents a current regenerative braking time.

The controller 130 may determine the accumulated average current (I_regen_acc) based on a previous accumulated average current (I_regen_pre), a previous accumulated regenerative braking time (T_regen_pre), the current average current (I_regen_cur), and the current regenerative braking time (T_regen_cur).

For example, the controller 130 may determine the accumulated average current of the battery 36 (I_regen_acc) by use of an equation 2.

$$I_{regen\_acc} = \frac{T_{regen\_pre} * I_{regen\_pre} + T_{regen\_cur} * I_{regen\_cur}}{T_{regen\_pre} + T_{regen\_cur}}.$$ [Equation 2]

I_regen_acc represents an accumulated average current of the battery 36 until the vehicle 1 terminates running, I_regen_pre represents a previous accumulated average current of the battery 36, T_regen_pre represents a previous accumulated regenerative braking time, I_regen_cur represents a current average current of the battery 36, and T_regen_cur represents a current regenerative braking time.

The controller 130 may determine the accumulated change amount of the SoC (ΔSOC_regen_acc) based on the previous accumulated change amount of the SoC (ΔSOC_regen_pre), and the current accumulated change amount of the SoC (ΔSOC_regen_cur).

For example, the controller 130 may determine the accumulated change amount of the SOC value of the battery 36 (ΔSOC_regen_acc) by use of an equation 3.

$$\Delta SOC_{regen\_acc} = \Delta SOC_{regen\_pre} + \Delta SOC_{regen\_cur}.$$ [Equation 3]

ΔSOC_regen_acc represents an accumulated change amount of the SOC value of the battery 36 until the vehicle 1 terminates running, ΔSOC_regen_pre represents a previous accumulated change amount of the SOC value of the battery 36, and ΔSOC_regen_cur represents a current accumulated change amount of the SOC value of the battery 36.

The controller 130 may determine the accumulated regenerative braking time (T_regne_acc) based on a current regenerative braking time (T_regne_cur) and a previous regenerative braking time (T_regne_pre).

For example, the controller 130 may determine the accumulated regenerative braking time (T regne_acc) by use of an equation 4.

$$T_{regen\_acc} = T_{regen\_pre} + T_{regen\_cur}.$$ [Equation 4]

T_regne_acc represents an accumulated regenerative braking time until the vehicle 1 terminates running, T_regne_pre represents a previous regenerative braking time and T_regne_cur represents a current regenerative braking time.

The power management apparatus 100 may identify whether the battery 36 is low charged and identify the cause of the low charge of the battery 36, based on the accumulated average voltage of the battery 36 (V_regen_acc), and the accumulated average current (I_regen_acc) and the accumulated change amount of the SoC (ΔSOC_regen_acc).

Figure 9:
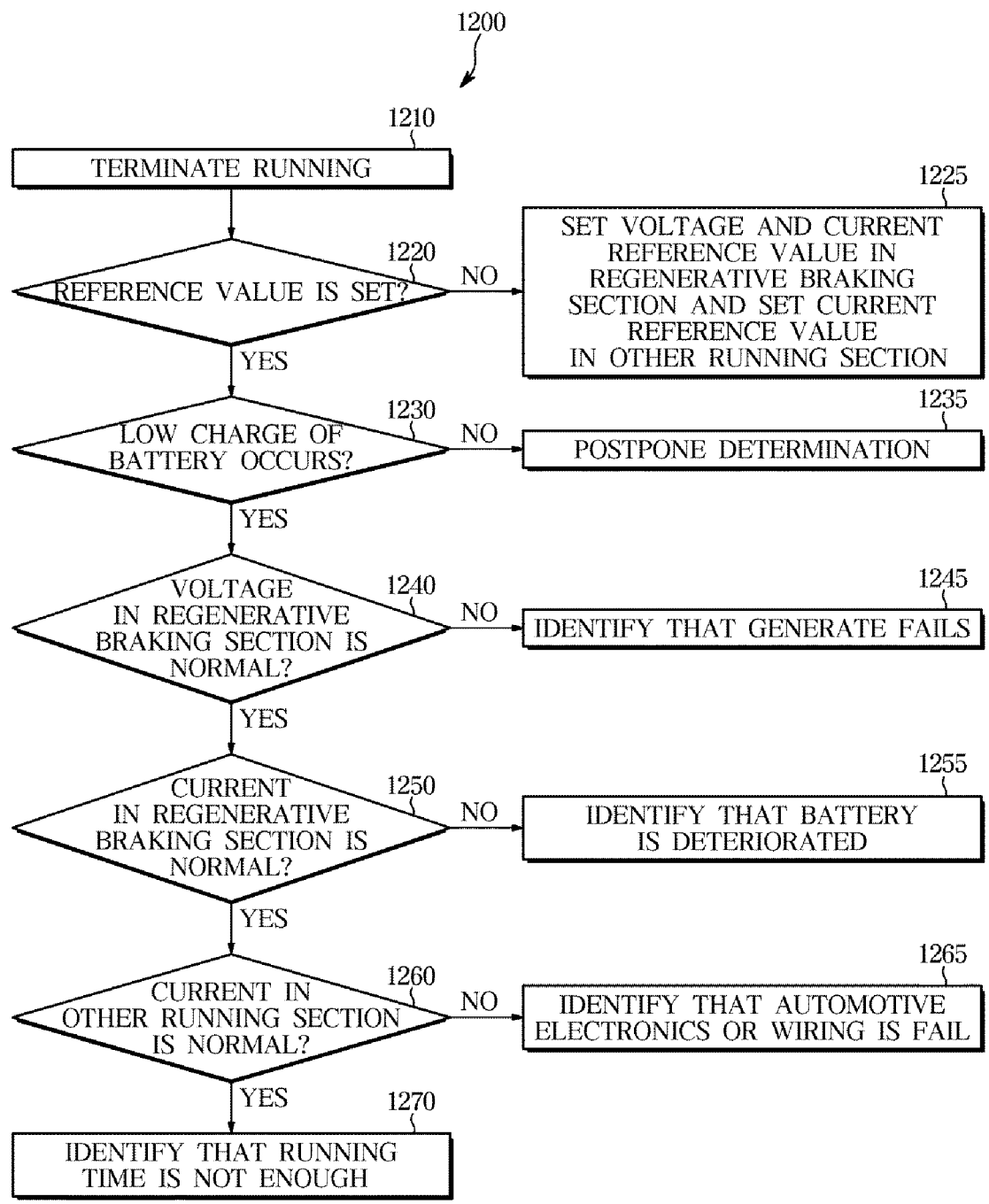
FIG. 9 is a view exemplarily illustrating a method for identifying a low-charged battery during running of the vehicle according to an exemplary embodiment of the present invention.
Figure 10:
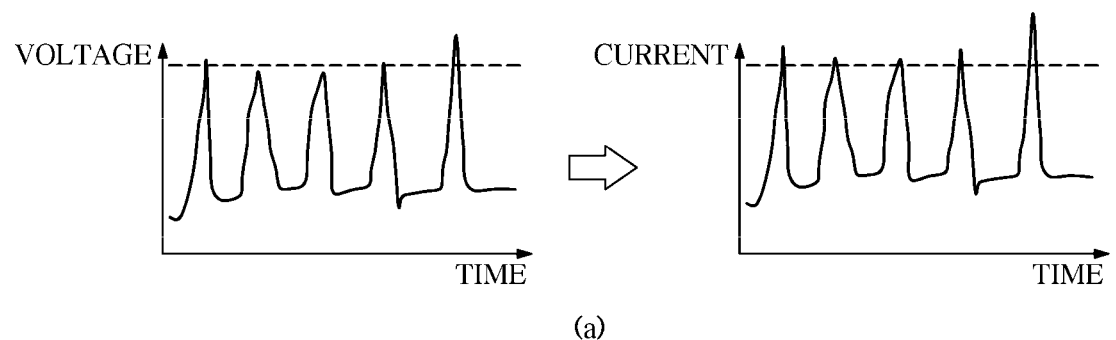
FIG. 10 is a view exemplarily illustrating a voltage and current of the battery according to a cause of a low-charged battery during running of the vehicle according to an exemplary embodiment of the present invention.
Figure 10:
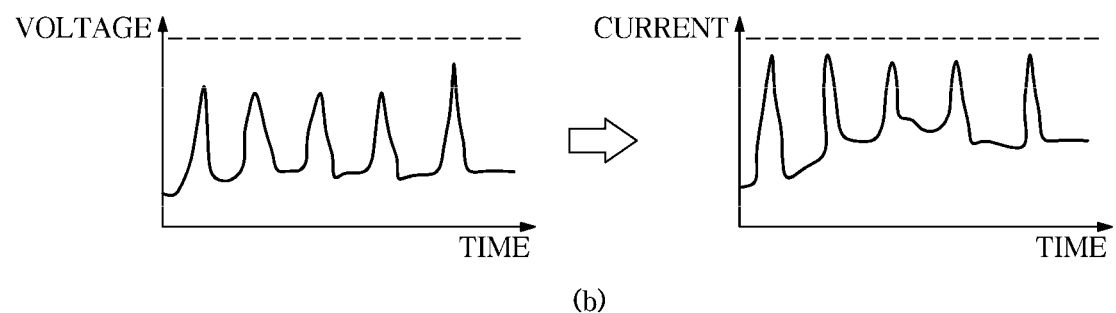
Figure 10:
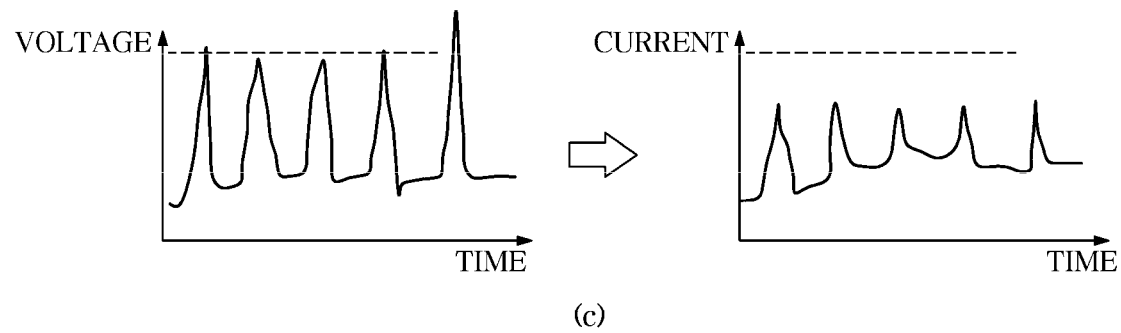

FIG. 9 is a view exemplarily illustrating a method for identifying a low-charged battery during running of the vehicle according to an exemplary embodiment of the present invention. FIG. 10 is a view exemplarily illustrating a voltage and current of the battery according to a cause of a low-charged battery during running of the vehicle according to an exemplary embodiment of the present invention.

A method for identifying the low charge of the battery while driving of the vehicle 1 (1200) will be describe with threshold to FIG. 9 and FIG. 10.

The power management apparatus 100 identifies that the vehicle 1 terminates running (1210).

The power management apparatus 100 may receive a starting signal from the engine controller 31 via the CNT. The controller 130 may receive the starting signal via the communicator 110. Furthermore, the power management apparatus 100 may identify whether the vehicle 1 terminates running based on the starting signal.

The power management apparatus 100 may identify whether a reference value is set to identify whether the battery 36 is low charged and to identify the cause of the low charge of the battery 36 (1220).

The controller 130 of the power management apparatus 100 may identify whether a reference value is set, based on whether a reference value, which is for identifying whether the battery 36 is low charged and for identifying the cause of the low charge, is stored in the storage 120.

When the reference value is not set (no in 1220), the power management apparatus 100 may set a reference value of voltage (V_regen_ref) in the regenerative braking section, a reference value of current in the regenerative braking section, and a reference value of current in other section (I_other_ref) (1225).

The controller 130 of the power management apparatus 100 may set an accumulated average voltage (V_regen_acc) for first three times of running of the vehicle 1, to a reference value of voltage (V_regen_ref) in the regenerative braking section. The controller 130 of the power management apparatus 100 may set an accumulated average current (I_regen_acc) for first three times of running of the vehicle 1, to a reference value of current (I_regen_ref) in the regenerative braking section The controller 130 may set a reference value of current in other section (I_other_ref) based on an average current of the battery 36 (I_other) in other section except the regenerative braking section for first three times of running of the vehicle 1.

The controller 130 may determine the average current of the battery 36 (I_other) in other section except the regenerative braking section by use of an equation 5.

$$I_{other} = \frac{C_{bat} * (SOC_{parking} - SOC_{run} - \Delta SOC_{regen})}{100 * (T_{run} - T_{regen})}.$$ [Equation 5]

I_other represents an average current of the battery 36 in other section except the regenerative braking section, C_bat represents a capacity of the battery 36, SOC_parking represents an SOC value of the battery 36 at a parking start time, SOC_run represents an SOC value of the battery 36 at a running start time, ΔSOC_regen represents a change amount of the SOC value of the battery 36 at the running of the vehicle 1, T_run represents a running time of the vehicle 1, and T_regen represents a regenerative braking time of the vehicle 1.

When the reference value is set (yes in 1220), the power management apparatus 100 may identify whether the battery 36 is low charged (1230).

The controller 130 of the power management apparatus 100 may determine the change amount (SOC_parking–SOC_run) of the battery 36 during parking based on a difference between the SOC value of the battery 36 (SOC_parking) at the terminating of running and the SOC value of the battery 36 (SOC_run) at starting of running. Furthermore, the controller 130 may identify the low charge of the battery 36 when an absolute value of a reduction rate of the SOC value of the battery 36 (SOC_parking–SOC_run) during parking is greater than a threshold reduction rate during running. The threshold reduction rate during running may vary according to the generation control of the vehicle 1 and the type of the battery 36.

When the low charge of the battery 36 does not occur (no in 1230), the power management apparatus 100 may postpone identifying the cause of the low charge of the battery 36 (1235).

When the low charge of the battery 36 occurs (yes in 1230), the power management apparatus 100 may identify whether a voltage of the battery 36 (V_regen_acc) in the regenerative braking section is normal (1240).

The controller 130 of the power management apparatus 100 may identify whether a voltage of the battery 36 in the regenerative braking section is normal, based on a difference between the accumulated average voltage of the battery 36 (V_regen_acc) in regenerative braking section, and a reference value of voltage of the battery 36 (V_regen_ref) in regenerative braking section. For example, when a difference (V_regen_acc–V_regen_ref) between the accumulated average voltage of the battery 36 (V_regen_acc) and the reference value of voltage of the battery 36 (V_regen_ref) is less than an error range (V_regen_var), the controller 130 may identify that the voltage of the battery 36 in the regenerative braking section is not normal. Furthermore, when the difference (V_regen_acc–V_regen_ref) between the accumulated average voltage of the battery 36 (V_regen_acc) and the reference value of voltage of the battery 36 (V_regen_ref) is equal to or greater than the error range (V_regen_var), the controller 130 may identify that the voltage of the battery 36 in the regenerative braking section is normal.

When the voltage of the battery 36 in the regenerative braking section is not normal (no in 1240), the power management apparatus 100 may identify that the generator 21c fails (1245).

As illustrate in FIG. 10A, the battery 36 in the normal state may output the normal voltage and current. When the generator 21c fails, the voltage output from the generator 21c may be reduced and thus the voltage of the battery 36 may be also reduced, as illustrated in FIG. 10B.

When the accumulated average voltage of the battery 36 (V_regen_acc) is significantly less than the reference value of voltage of the battery 36 (V_regen_ref), which is when the difference (V_regen_acc–V_regen_ref) between the accumulated average voltage of the battery 36 (V_regen_acc) and the reference value of voltage of the battery 36 (V_regen_ref) is less than the error range (V_regen_var), the controller 130 of the power management apparatus 100 may identify that the low charge of the battery 36 is caused by the failure of the generator 21c.

When the voltage of the battery 36 in the regenerative braking section is normal (yes in 1240), the power management apparatus 100 may identify whether the current of the battery 36 (I_regen_acc) in the regenerative braking section is normal (1250).

The controller 130 of the power management apparatus 100 may identify whether a current of the battery 36 in the regenerative braking section is normal, based on a difference between the accumulated average current of the battery 36 (I_regen_acc) in regenerative braking section, and a reference value of current of the battery 36 (I_regen_ref) in regenerative braking section. For example, when a difference (I_regen_acc–I_regen_ref) between the accumulated average current of the battery 36 (I_regen_acc) and the reference value of current of the battery 36 (I_regen_ref) is less than an error range (I_regen_var), the controller 130 may identify that the current of the battery 36 in the regenerative braking section is not normal. Furthermore, when the difference (I_regen_acc−I_regen_ref) between the accumulated average current of the battery 36 (I_regen_acc) and the reference value of current of the battery 36 (I_regen_ref) is equal to or greater than the error range (I_regen_var), the controller 130 may identify that the current of the battery 36 in the regenerative braking section is normal.

When the current of the battery 36 in the regenerative braking section is not normal (no in 1250), the power management apparatus 100 may identify the deterioration of the battery 36 (1255).

As illustrate in FIG. 10A, the battery 36 in the normal state may output the normal voltage and current. When the battery 36 deteriorates, the voltage output from the generator 21c may be in a reference range but the current of the battery 36 may be reduced, as illustrated in FIG. 10C.

When the accumulated average current of the battery 36 (I_regen_acc) is significantly less than the reference value of current of the battery 36 (I_regen_ref), which is when the difference (I_regen_acc−I_regen_ref) between the accumulated average current of the battery 36 (I_regen_acc) and the reference value of current of the battery 36 (I_regen_ref) is less than the error range (I_regen_var), the controller 130 of the power management apparatus 100 may identify that the low charge of the battery 36 is caused by the deterioration of the battery 36.

When the current of the battery 36 in the regenerative braking section is normal (yes in 1250), the power management apparatus 100 may identify whether the current of the battery 36 (I_other) in other running section is normal (1260).

The controller 130 of the power management apparatus 100 may identify whether a current of the battery 36 in the other running section is normal, based on a difference between the average current of the battery 36 (I_other) in other running section, and the reference value of current in other running section (I_other_ref). For example, when a difference (I_other−I_other_ref) between the average current of the battery 36 (I_other) and reference value of current in other running section (I_other_ref) is less than an error range (I_other_var), the controller 130 may identify that the current of the battery 36 in the regenerative braking section is not normal. Furthermore, when the difference (I_other−I_other_ref) between the average current of the battery 36 (I_other) and reference value of current in other running section (I_other_ref) is equal to or greater than the error range (I_other_var), the controller 130 may identify that the current of the battery 36 in the other running section is normal.

When the current of the battery 36 in the other running section is not normal (no in 1260), the power management apparatus 100 may identify the automotive electronics 30 and/or wiring (1265).

When the voltage and current of the battery 36 in the regenerative braking section is normal, the controller 130 of the power management apparatus 100 may identify that the generator 21c and the battery 36 are operated, normally. Furthermore, when the voltage and current of the battery 36 in the regenerative braking section is normal and when the current of the battery 36 in other running section is not normal, the controller 130 may identify that the low charge of the battery 36 is caused by any one of the failure of the automotive electronics 30 and/or disconnected/short of the wiring.

When the current of the battery 36 in the other running section is normal (yes in 1260), the power management apparatus 100 may identify that a running time is not enough (1270).

When the voltage and current of the battery 36 during running of the vehicle 1 is normal, the controller 130 of the power management apparatus 100 may identify that the generator 21c, the battery 36 and the automotive electronics 30 are operated, normally. Therefore, the controller 130 may identify that the low charge of the battery 36 is caused by the lack of time for charging the battery 36.

As mentioned above, the power management apparatus 100 may identify whether the battery 36 is low charged based on the SOC value of the battery 36 and identify the cause of the low charge of the battery 36 based on the voltage and current of the battery 36.

Therefore, the vehicle 1 may identify whether the battery 36 is low charged and identify the cause of the low charge of the battery 36, by itself by use of simple control logic without an additional manager. Accordingly, a driver and/or an inspector may take an appropriate action according to whether the battery 36 is low charged and the cause of the low charge of the battery 36 and thus it may be possible to prevent problems generated by the low charge of the battery 36.

As is apparent from the above description, according to the provided vehicle, controlling method thereof, and power management apparatus, it may be possible to identify the cause of the low charge of the battery. Furthermore, the vehicle may inspect the power system in the vehicle in advance and perform an appropriate response according to the result of the inspection.

It may be possible to extend the battery life and improve the performance of the power system by actively identifying the cause of the low charge of the battery.

Although a few embodiments of the present invention have been shown and described, it would be appreciated by those skilled in the art that changes may be made in these embodiments without departing from the principles and spirit of the disclosure, the scope of which is defined in the claims and their equivalents.

Exemplary embodiments of the present invention have been described above. In the exemplary embodiments described above, some components may be implemented as a "module". Here, the term 'module' device, but is not limited to, a software and/or hardware component, such as a Field Programmable Gate Array (FPGA) or Application Specific Integrated Circuit (ASIC), which performs certain tasks. A module may advantageously be configured to reside on the addressable storage medium and configured to execute on one or more processors.

Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The operations provided for in the components and modules may be combined into fewer components and modules or further separated into additional components and modules. Furthermore, the components and modules may be implemented such that they execute one or more CPUs in a device.

With that being said, and in addition to the above described exemplary embodiments of the present invention, embodiments can thus be implemented through computer readable code/instructions in/on a medium, e.g., a computer readable medium, to control at least one processing element to implement any above described exemplary embodiment of the present invention. The medium can correspond to any medium/media permitting the storing and/or transmission of the computer readable code.

The computer-readable code may be recorded on a medium or transmitted through the Internet. The medium may include Read Only Memory (ROM), Random Access Memory (RAM), Compact Disk-Read Only Memories (CD-ROMs), magnetic tapes, floppy disks, and optical recording medium. Also, the medium may be a non-transitory computer-readable medium. The media may also be a distributed network, so that the computer readable code is stored or transferred and executed in a distributed fashion. Still Furthermore, as only an example, the processing element may include at least one processor or at least one computer processor, and processing elements may be distributed and/or included in a single device.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A power management apparatus of a vehicle including a generator to generate power, and a battery to charge electrical power generated by the generator, the apparatus comprising:
a communicator configured to communicate with a battery sensor configured to detect a voltage, a current and a state of charge (SOC) value of the battery; and
a controller configured to:
receive the voltage, the current and the SOC value of the battery from the: battery sensor through the communicator, configured to:
identify whether the battery is a low charge based on the SOC value of the battery received by the communicator, in response to the low charge of the battery; and
identify a cause of the low charge of the battery based on at least one of the voltage and the current of the battery received by the communicator,
wherein the controller is further configured to:
identify the cause of the low charge of the battery as a failure of the generator based on the voltage of the battery received by the communicator in a regenerative braking of the vehicle, and
identify the cause of the low charge of the battery as deterioration of the battery based on the current of the battery received by the communicator in the regenerative braking of the vehicle.

2. The power management apparatus of claim 1, wherein the controller is configured to identify that the cause of the low charge of the battery is a dark current of the vehicle, based on when an average dark current during parking of the vehicle is greater than a reference dark current.

3. The power management apparatus of claim 1, wherein the controller is configured to identify that the cause of the low charge of the battery is an excessive parking time, based on when a parking time of the vehicle is greater than a reference parking time.

4. The power management apparatus of claim 1, wherein the controller is configured obtain an average voltage of the battery in the regenerative braking of the vehicle based on the voltage of the battery received by the communicator, and identify the failure of the generator based on the obtained average voltage of the battery.

5. The power management apparatus of claim 1, wherein the controller is configured to obtain an average current of the battery in the regenerative braking of the vehicle based on the current of the battery received by the communicator, and identify the deterioration of the battery based on the obtained average current of the battery.

6. The power management apparatus of claim 1, wherein the controller is configured to identify that the cause of the low charge of the battery is a failure of electrical loads contained in the vehicle or a lack of driving time, based on an average current of the battery in other driving except the regenerative braking of the vehicle.

* * * * *